Oct. 7, 1941.   C. KELLER   2,258,094
VARIABLE-PITCH PROPELLER
Filed Nov. 7, 1939   4 Sheets-Sheet 1

Inventor
Curt Keller
By
Dodge Ava Ins.
Attorneys

Oct. 7, 1941.  C. KELLER  2,258,094
VARIABLE-PITCH PROPELLER
Filed Nov. 7, 1939  4 Sheets-Sheet 2
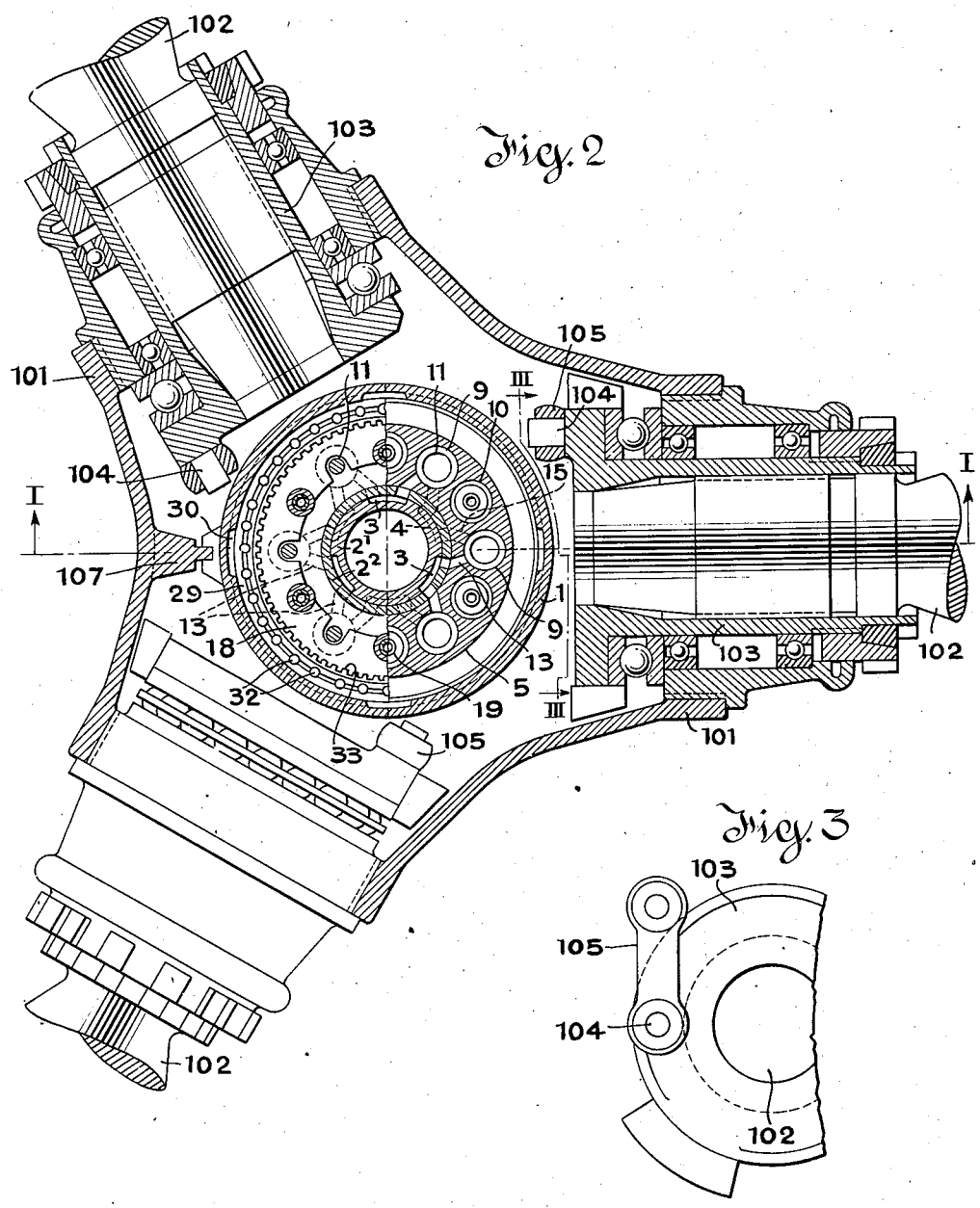

Oct. 7, 1941.    C. KELLER    2,258,094
VARIABLE-PITCH PROPELLER
Filed Nov. 7, 1939    4 Sheets-Sheet 3

Inventor
Curt Keller
By Dodge and Sons
Attorneys

Oct. 7, 1941.   C. KELLER   2,258,094
VARIABLE-PITCH PROPELLER
Filed Nov. 7, 1939   4 Sheets-Sheet 4

Inventor
Curt Keller
By Dodge ... Sons
Attorneys

Patented Oct. 7, 1941

2,258,094

UNITED STATES PATENT OFFICE 2,258,094

VARIABLE-PITCH PROPELLER

Curt Keller, Zurich, Switzerland, assignor to Escher Wyss Maschinenfabrieken Aktiengesellschaft, Zurich, Switzerland, a corporation of Switzerland Application November 7, 1939, Serial No. 303,308
In Switzerland November 30, 1938

9 Claims. (Cl. 170—163)

My invention relates to a device for the hydraulic control of the blades of variable-pitch propellers.

An object of the invention is to improve the construction of devices of this type and secure greater compactness and lighter construction. The invention reduces the number of parts and permits all of the parts to be constructed as bodies of rotation so that they may be economically manufactured.

The propeller blades are individually swiveled in a hub casing which is fixed on a tubular shaft. Also fixed on this shaft is a piston which works in a double acting cylinder splined within the hub casing so that the cylinder cannot rotate relatively to the casing. This cylinder is connected by links with the various propeller blades in such a way that as the cylinder moves in the direction of the axis of the shaft, it rotates the blades about their longitudinal axes and thus modifies the pitch of the propeller. The piston fixed on the shaft encloses a dental clutch mechanism which locks the cylinder against axial motion except when the control device operates to establish hydraulic pressure differentials between the two ends of the cylinder to effect the motion of the cylinder and the consequent adjustment of the pitch of the blades.

This locking mechanism, which is an important feature of the invention, includes a ring swiveled on the periphery of the piston and threaded to engage quick pitch thread grooves formed on the interior of the cylinder wall. It follows that axial motion of the cylinder entails rotary motion of the ring relatively to the piston. The ring has on its internal surface an annular dental portion serving as one component of a dental clutch, the other component being a clutch disc which is axially shiftable within the piston but which is held against rotation relatively to the piston. Springs are used to bias the disc to its mid position in which it engages the ring.

To move the clutch disc in axial directions use is made of a plurality of symmetrically arranged double acting pistons which also perform a valve function such as to insure the disengagement of the clutch disc before pressure fluid may flow to either and from the other working space of the cylinder. Thus, when hydraulic fluid is delivered to one and vented from the other of the two ports which lead to opposite sides of said valved pistons, the first effect is to displace the valved pistons which are always exposed to the pressure fluid in these ports, with the result that the dental clutch is disengaged, whereupon fluid is permitted to flow past the valved pistons to one chamber and to be vented from the other chamber on opposite sides of the main piston to cause the cylinder to move axially.

In one form of the invention the dental clutch disc is urged to its center or engaging position by sets of opposed springs which are associated with means distinct from the valved pistons, said clutch disc being prevented in its engaging position from rotating relatively to the main piston. In another form of the invention the centering spring action and the retention of the clutch ring against rotation are each performed by means directly associated with the valved pistons. Both arrangements have the advantage that the structure is perfectly symmetrical and therefore perfectly balanced. Functionally they are essentially the same.

In the drawings:

Fig. 2 is a section on the line II—II of Fig. 1,

Fig. 3 is an end view of a detail seen in the direction of the arrows III of Fig. 2.

Figure 1:
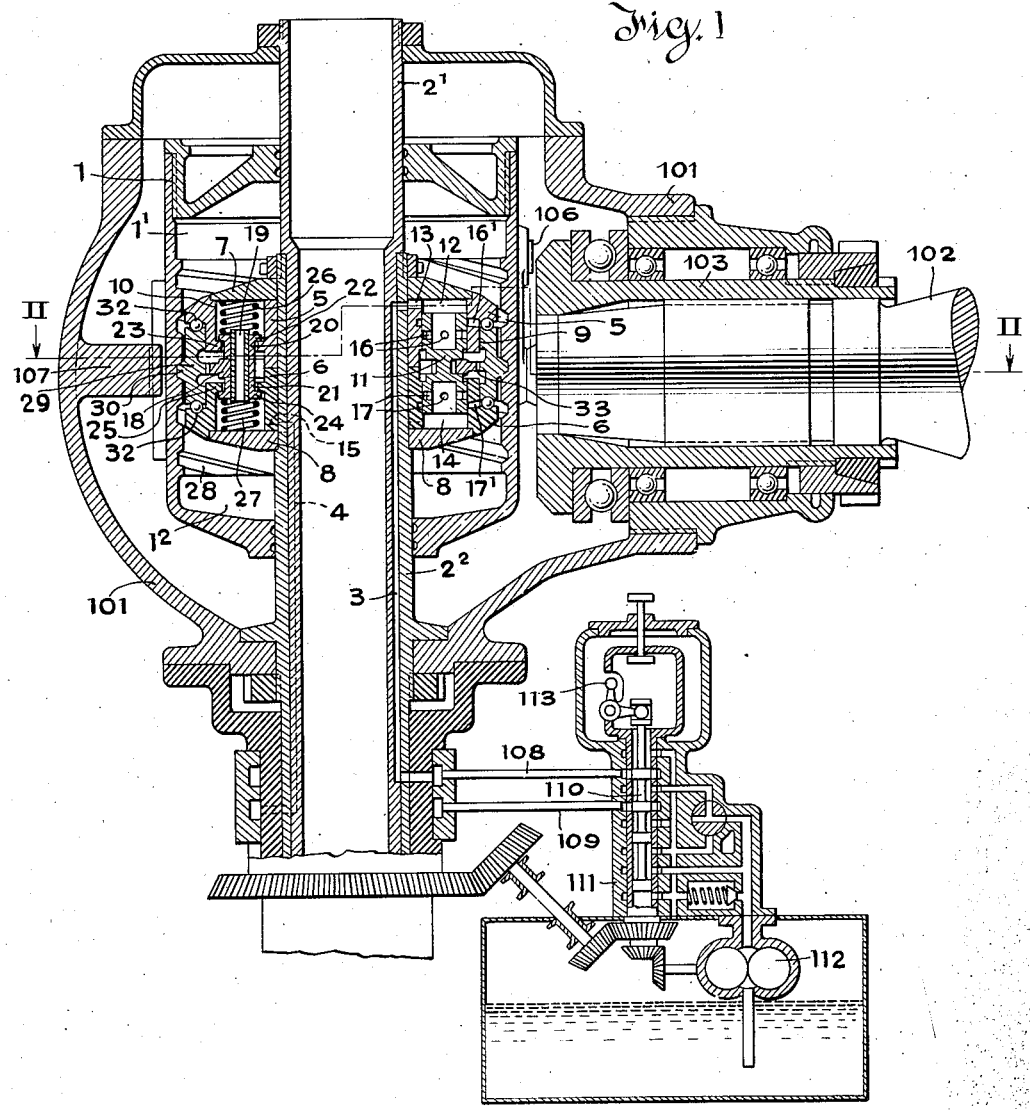
Fig. 1 is an axial longitudinal section on the line I—I of Fig. 2 through the first constructional form of a variable-pitch propeller to which the present invention is applied, only part of one of the blades being shown for the sake of clearness.
Figure 4:
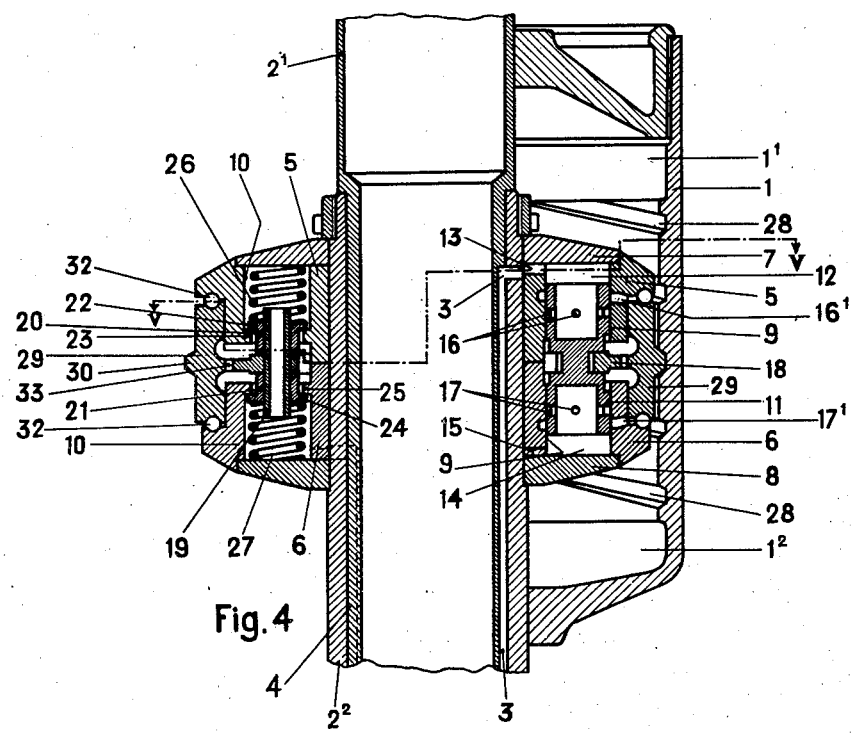
Figure 5:
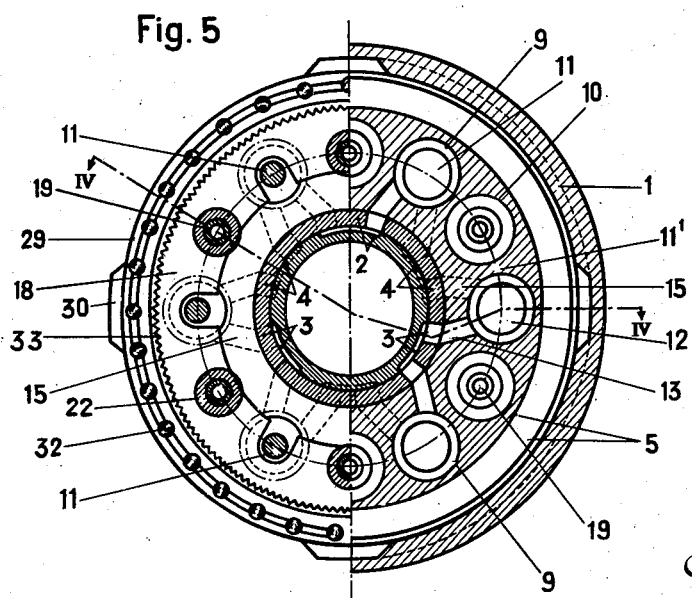

Figs. 4 and 5, respectively, show on an enlarged scale the motor mechanism similarly illustrated in Figs. 1 and 2, Fig. 5 being a section on the line V—V of Fig. 4.

Figure 6:
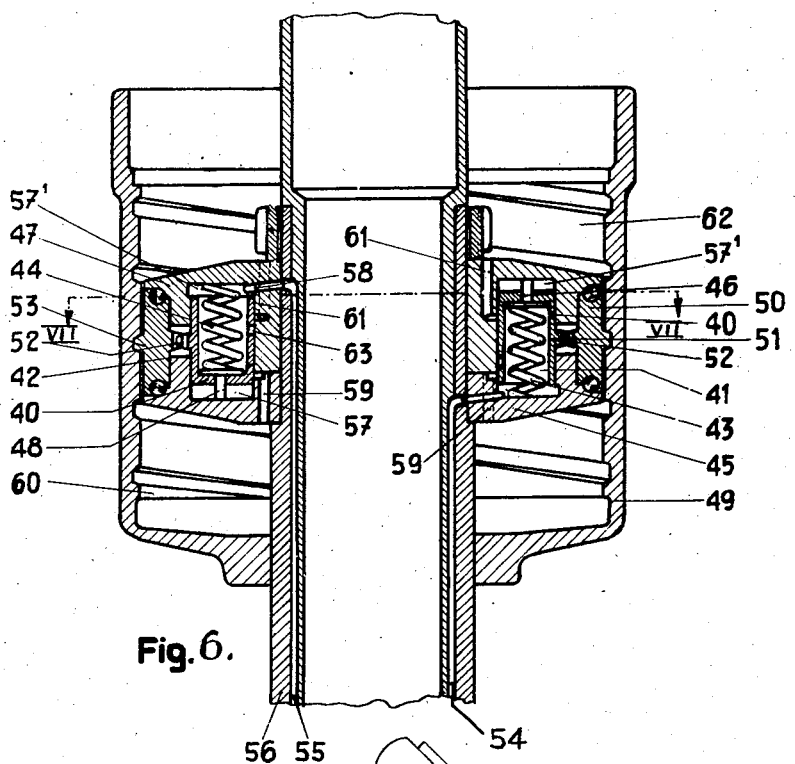
Figure 7:
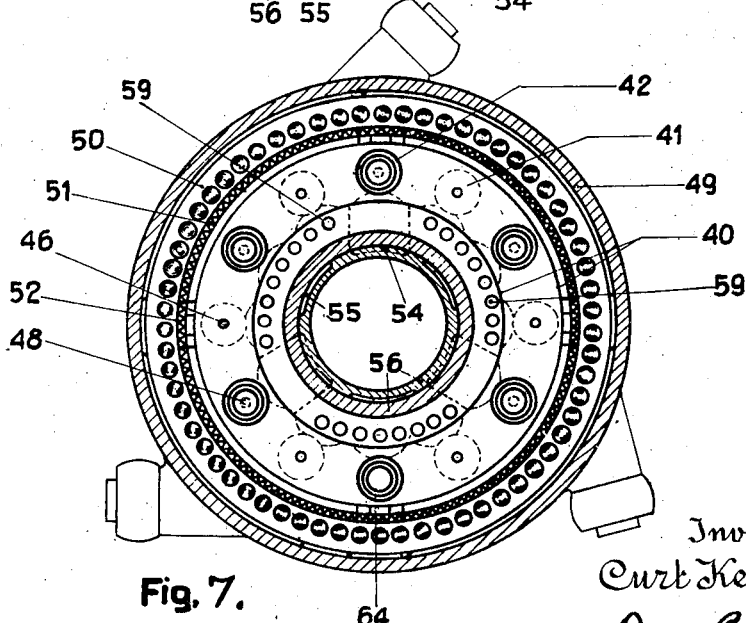

Fig. 6 is an axial longitudinal section through a portion of the second constructional form of the controlling device, and Fig. 7 is a section on the line VII—VII of Fig. 6, the upper cover of the main piston being removed.

Referring to the drawings, 101 (Figs. 1 to 5) denotes the hub casing of an aeroplane propeller with three adjustable blades 102. Each of these blades 102 is fixed in a socket 103 which carries a pin 104 which is connected by means of a link 105 (see also Fig. 3) with a pin 106 mounted on a cylinder 1. This cylinder 1 is formed with a pair of lugs which coact with a longitudinal rib 107 (see Fig. 2) within the hub casing 101 so that the cylinder is prevented from rotating relatively to the hub casing but may move axially relatively thereto. The cylinder 1 is mounted to slide longitudinally on the propeller shaft consisting of two concentric tubes $2^1$, $2^2$ constituting a rigid unit. Any longitudinal movement of the cylinder 1 is converted by the links 105 into a rotary movement of the blades 102 so that the latter are adjusted in the desired direction. The central opening provided by the inner tube 2¹ enables shooting to be done through the hub of the propeller.

3 and 4 are two groups of longitudinal ports formed by the walls of the two concentric tubes 2¹, 2². These two groups of ports 3 and 4 are connected to pipes 108 and 109 (Fig. 1) respectively. 110 denotes an axially movable valve of a distributing device 111 controlling the admission of a liquid under pressure to the pipes 108, 109 and its outflow from these pipes. The arrangement is such that when one pipe is connected to supply, the other is connected to exhaust. The distributing device 111 is connected to a pump 112 delivering said liquid under pressure, preferably oil. The control valve 110 is actuated by a centrifugal governor 113 which is driven, together with the pump 112, by the propeller shaft 2¹, 2².

5 and 6 denote two parts of a main piston, which are rigidly mounted on the tube 2² and held together by two cover discs 7, 8. Hence the piston formed of the parts 5 to 8 inclusive is fixed relatively to the hub casing 101. In the parts 5 and 6 of the piston are two groups of bores 9, 10 which are arranged around the axis of the tubes 2¹, 2² and run parallel with this axis. The axes of all these bores 9, 10 lie on a cylindrical surface 11¹ (Fig. 5) which is coaxial with the tubes 2¹, 2². The bores 9 and 10 are equal in number and alternate so that there are two intercalated sets. All the bores 10 are closed at their opposite outer ends by the discs 7 and 8. In each of the bores 9 is placed a controlling piston 11, the space 12 (Figs. 1 and 4) on one side of each piston 11 communicating through a port 13 in the part 5 of the piston with one of the ports 3 of the tubes 2¹, 2², while the space 14 on the other side of each controlling piston 11 communicates through a port 15 with one of the ports 4 of the tubes 2¹, 2². Each controlling piston 11 has two groups of drilled ports 16, 17 circumferentially arranged as shown. 16¹ are ports provided in the part 5 of the piston which are adapted to connect the spaces 12 with the space 1¹ of the cylinder 1, and 17¹ are corresponding ports provided in the part 6 of the piston which are adapted to connect the spaces 14 with the space 1² of the cylinder 1. Engaging the several controlling pistons 11 so as to partake of the axial motion thereof is a common ring 18 the centre of which lies in the axis of the tubes 2¹, 2². Each of the bores 10 is formed with a shoulder 23 or 25 as the case may be, the shoulders 23 being in the part 5 and the shoulders 25 being in the part 6. Combined bushings and spring seats 20 and 21 which form opposed sets are mounted in the bores 10 and are limited in their motion toward each other by flanges 22 and 24 formed at their outer ends. These bushings are urged toward each other by coil compression springs 26 and 27 which are mounted in the bores 10 and react against the cover plates 7 and 8. In their innermost position the bushings 20 and 21 center the ring 18, which is the dental clutch ring. To hold this ring against rotation and to guide its axial movement, tubular pins 19 are mounted in the ring 18 and project in opposite directions therefrom, the projecting portions of the tubular pins being guided in the bushings 20 and 21 above described. The bushings are so dimensioned that in their positions of closest approach they accurately center the clutch ring 18 but the latter may be forced in either direction for a limited distance, in which event one set of springs 26 or 27 is compressed and the other merely holds the corresponding bushings at their innermost positions.

Inside the axially movable cylinder 1, is cut a multiple quick pitch screw thread 28, the pitch angle of which is greater than its angle of friction. 29 denotes a peripheral ring which is swiveled on the parts 5, 6 of the main piston. On the outer periphery of ring 29 is cut a screw thread 30, which always engages in the screw thread 28 of the cylinder 1. In order to take up thrust in the direction of the axis of the tubes 2¹, 2² both sides of this ring 29 bear on balls 32. On its inside the ring 29 is provided with a series of teeth 33, which mesh with a corresponding series of teeth on the external periphery of the ring 18.

The way in which the apparatus described works is as follows:

In Figs 1 and 4 the various parts are shown in their middle position. In this position the ring 18 prevents the ring 29 from rotating on the main piston formed by the parts 5, 6. The axially movable cylinder 1 is therefore locked.

If the propeller blades 102 are to be set or adjusted in a definite position, one group of ports 3 or 4 respectively is connected to the source of medium under pressure, i. e. the pump 112, and the other group of ports 4 or 3 respectively is connected with the discharge. Let it be assumed that medium under pressure flows in through pipe 108 and the ports 3 and passes into the spaces 12 of the borings 9. If the pressure which arises in these spaces 12 exceeds the pressure exerted by the springs 27, the controlling pistons 11 will be thrust downwards and thereby also the ring 18 with which they are interengaged so that its teeth will be brought out of engagement with the internal series of teeth 33 on the ring 29. This latter can now rotate freely. Owing to the above mentioned downward movement of the controlling pistons 11, after the ring 29 has been released from the ring 18, the ports 16¹ are also opened so that now medium under pressure can pass out of the spaces 12 into the cylinder space 1¹. On the other hand a discharge of medium under pressure out of the cylinder space 1² through the ports 17¹ and the borings 17 in the controlling piston 11 into the ports 15 and out of these latter into the ports 4 is rendered possible. The pressure which now prevails in the cylinder space 1¹ is capable of displacing the cylinder 1 upwards, whereby the adjustment of the blades 102 aimed at is accomplished in the desired direction. The screw-threaded ring 29 rotates freely during this time as the screw thread is not a self-locking one.

As soon as the admission of medium under pressure through the ports 3 is interrupted, the springs 27 are able to press the bushes 21 with their stops 24 against the stops 25 again, so that the ring 18 and thus also the controlling pistons 11 are brought back into their position. This causes the external series of teeth on the ring 18 to be brought into engagement with the internal series of teeth 33 on the ring 29, whereby the cylinder 1 is locked again. The teeth on the ring 18 are so constructed that they can be brought into engagement with the teeth 33 on the ring 29 in every peripheral position of the ring 18. During the entire duration of the above operations the bushes 20 are pressed by the springs 26 against the stops 23, so that during the above mentioned movement of the ring 18 out of its central position they have not exerted any force upon the latter.

The above described parts of the locking device proper are perfectly symmetrically built; if therefore the ports 4 be connected to the pump 112 and the ports 3 with the discharge, actions like those described will take place, but with the difference that the cylinder 1 is then not displaced upwards, but downwards.

The constructional form shown in Figs. 6 and 7 differs from the one just described by the fact that the controlling pistons 11, the ring 18 and the pins 19 are grouped together into a single, axially movable ring 40 the axis of which lies in the axis of the propeller. In this ring 40 are provided, alternately from below and above, bores 41, 42. The axes of these bores 41, 42 lie on a cylindrical surface, the axis of which coincides with the axis of the tube 56, i. e. the propeller shaft. In these bores are arranged compression springs 43 and 44 respectively with their axes parallel with the axis of the propeller. The springs 43 bear against the part 45 of the main piston and distance pieces 46, while the springs 44 bear against the part 47 of the main piston and the distance pieces 48. When the ring 40 has been moved out of its central position in one direction or the other by the liquid under pressure, the springs 43 and 44 tend to bring it back into its central position every time. 49 denotes the axially movable cylinder, on the inside of which, as before, a screw thread is cut, and 50 denotes a ring which is mounted to rotate on the main piston formed by the parts 45, 47 and which has on its external periphery a screw thread 53, which engages in the screw thread on the cylinder 49, while an internal series of teeth 52 on this ring 50 can cooperate with a series of teeth 51 on the ring 40. 54 and 55 denote two groups of ports which are provided in the tube 56 and serve alternately for the admission and discharge of a medium under pressure in the spaces 57 and 57¹ respectively of the main piston. 64 (Fig. 7) denotes guide cams which prevent the ring 40 from rotating relatively to the main piston.

If medium under pressure be admitted through the group of ports 54 for example, the pressure of the liquid in the annular space 57 acts on the ring 40, which therefore is displaced upwards against the forces exerted by the springs 44. This causes its teeth 51 to be brought out of engagement with the teeth 52 of the screw threaded ring 50. Simultaneously controlling ports 59 for the passage of medium under pressure from the annular space 57 to the space 60 of the cylinder 49 are opened. On the other hand controlling ports 61, which are in communication with the space 62 of the cylinder 49, are connected by borings 63 in the ring 40 with the annular space 57¹, so that medium under pressure can flow out of the space 62 into the borings 42 and out of these latter through ports 58 into the ports 55. The ports 59, 61 are however, only opened for the passage of medium under pressure after the teeth 51, 52 have been brought out of engagement. If no medium under pressure flows to the ports 54 and 55 respectively, or if the pressure fails for any reason, the ring 40 will be held by the springs 43, 44 in the middle position shown in the drawing, in which the teeth 51 of this ring 40 engage with the teeth 52 of the ring 50 and the latter therefore locks the cylinder 49.

The way in which this second locking device works is, owing to the symmetrical construction thereof, the same in principle for both directions of motion of the cylinder 49. The advantage of the concentric type of construction is that no centrifugal forces of one part act adversely on other parts but are absorbed in themselves.

What is claimed is:

1. The combination of a rotary shaft, a double acting fluid pressure motor having opposed working spaces and comprising coacting cylinder and piston elements mounted coaxially with said shaft and each constrained to rotate therewith, one thereof being axially movable relatively to the shaft; a dental clutch ring concentric with the cylinder and piston elements, swiveled as to one element and having quick pitch thread engagement with the other; a coacting dental clutch disc axially shiftable but constrained against rotation relative to the element on which said clutch ring is swiveled and having a mid position in which it engages with the clutch ring to inhibit rotation thereof and oppositely displaced disengaged positions; yielding means biasing said clutch disc toward said engaging position; means for creating fluid pressure differentials in the working spaces of said motor; and fluid pressure operated means responsive to the last named means to shift said clutch ring selectively to said disengaging positions while such differentials persist and permit return to engaging position as soon as said pressure differential disappears.

2. The combination defined in claim 1 in which the clutch ring is swiveled on the periphery of the piston and engages quick pitch threads in the cylinder wall and the axially shiftable clutch disc is mounted within the piston.

3. The combination defined in claim 1 in which the cylinder is the axially shiftable element of the motor, and the piston is fixed on the shaft, the shaft and piston having ports formed therein leading to the working spaces of the motor, the clutch ring is swiveled on the periphery of the piston and engages threads formed in the cylinder wall, the clutch disc is housed in the piston and the fluid pressure operated means which shift the clutch disc comprise a plurality of symmetrically arranged valved pistons connected to shift the disc, controlling flow through said ports, shiftable by pressure differential developed therein and serving to obstruct said ports when the disc is in mid position and open them when the disc has been displaced to a disengaging position.

4. A blade adjusting propeller hub unit comprising in combination a rotary shaft; a blade adjusting motor inclusive of a piston and a coacting cylinder forming two working spaces respectively on opposite sides of the piston, both the cylinder and piston being coaxial with the shaft and constrained to rotate therewith and the cylinder being axially shiftable relatively to the shaft; blade adjusting means operable by the axial shifting of the cylinder; a ring swiveled on the piston and having quick pitch thread engagement with the cylinder, said ring having within the piston a concentric annular dental clutch portion; a mating annular dental clutch disc within the piston concentric with the shaft and constrained to rotate therewith, said disc being axially shiftable in opposite directions to disengaged positions from a middle engaged position; yielding means urging said disc to said engaged position; stops limiting the action of said yielding means to define said engaged position; means for developing selectively reversely acting pressure differentials in said working spaces; and fluid pressure operated means responsive to development and maintenance of said differentials for shifting said disc selectively to one or the other disengaged positions while said differentials persist.

5. The combination defined in claim 4 in which the yielding means comprises circular series of identical symmetrically spaced coil springs, the series being concentric with, and the axes of the coils parallel with, the axis of said rotary shaft.

6. A blade adjusting propeller hub unit comprising in combination a rotary shaft; a blade adjusting motor inclusive of a piston and a coacting cylinder forming two working spaces respectively on opposite sides of the piston, both the cylinder and piston being coaxial with the shaft and constrained to rotate therewith and the cylinder being axially shiftable relatively to the shaft; blade adjusting means operable by the axial shifting of the cylinder; a ring swiveled on the piston and having quick pitch thread engagement with the cylinder, said ring having within the piston a concentric annular dental clutch portion; a mating annular dental clutch disc within the piston concentric with the shaft and constrained to rotate therewith, said disc being axially shiftable in opposite directions to disengaged positions from a middle engaged position; yielding means urging said disc to said engaged position; means for developing fluid pressure differentials between the working space of said motor, including ports in the shaft and piston for supplying pressure fluid to either working space while venting the other; and a circumferential series of symmetrically spaced identical valved pistons and cylinders, the pistons being connected with said disc to shift the same and shiftable by pressures developed in said ports, the series being concentric with and the axes of the pistons parallel with the axis of said shaft, said pistons obstructing flow through said ports except when said clutch disc is displaced sufficiently to disengage.

7. A blade adjusting propeller hub unit comprising in combination a rotary shaft; a blade adjusting motor inclusive of a piston and a coacting cylinder forming two working spaces respectively on opposite sides of the piston, both the cylinder and piston being coaxial with the shaft and constrained to rotate therewith and the cylinder being axially shiftable relatively to the shaft; blade adjusting means operable by the axial shifting of the cylinder; a ring swiveled on the piston and having quick pitch thread engagement with the cylinder, said ring having within the piston a concentric annular dental clutch portion; a mating annular dental clutch disc within the piston concentric with the shaft and constrained to rotate therewith, said disc being axially shiftable in opposite directions to disengaged positions from a middle engaged position; yielding means urging said disc to said engaged position, said means including two opposed circular series of symmetrically spaced coil springs, the series being concentric with and the axes of the coils parallel with the axis of said rotary shaft; stops limiting the action of said springs to define said engaged position; means for developing fluid pressure differentials between the working space of said motor, including ports in the shaft and piston for supplying pressure fluid to either working space while venting the other; and a circumferential series of symmetrically spaced identical valved pistons, the pistons being connected with said disc to shift the same and shiftable by pressures developed in said ports, the series being concentric with and the axes of the pistons parallel with the axis of said shaft, said pistons obstructing flow through said ports except when said clutch disc is displaced sufficiently to disengage.

8. The combination of a rotary shaft, a double acting fluid pressure motor having opposed working spaces and comprising coacting cylinder and piston elements mounted coaxially with said shaft and each constrained to rotate therewith, one thereof being axially movable relatively to the shaft; a ring concentric with the cylinder and piston elements swiveled as to one element and having quick pitch thread engagement with the other; locking means for preventing rotation of said ring; yielding means biasing said locking means toward active position; means for creating reverse fluid pressure differentials in the working spaces of said motor; and fluid pressure operated means responsive to the last named means to release said locking means.

9. The combination defined in claim 8 in which the ring is swiveled on the periphery of the piston and engages quick pitch threads in the cylinder and the ring locking means is mounted wholly within the piston

CURT KELLER.